United States Patent [19]

Okuma et al.

[11] Patent Number: 5,627,351
[45] Date of Patent: May 6, 1997

[54] SPARK ARRESTER FOR AN EXHAUST UNIT OF A VEHICLE

[75] Inventors: Takanori Okuma; Fumiaki Okubo; Hideyuki Tawara, all of Saitama, Japan

[73] Assignee: Honda Giken Kogyo Kabushiki Kaisha, Tokyo, Japan

[21] Appl. No.: 476,328

[22] Filed: Jun. 7, 1995

[30] Foreign Application Priority Data

Jun. 11, 1994 [JP] Japan ................................ 6-152772
Apr. 5, 1995 [JP] Japan ................................ 7-080321

[51] Int. Cl.⁶ ........................................................ F01N 3/02
[52] U.S. Cl. ............................... 181/231; 181/228; 55/276
[58] Field of Search ....................... 181/227, 228, 181/231, 255, 258, 282; 55/276

[56] References Cited

U.S. PATENT DOCUMENTS 3,129,078  4/1964  Hobbs ........................... 181/282
3,786,896  1/1974  Foster et al. .................. 181/231
4,318,720  3/1982  Hoggatt ......................... 55/276
4,332,307  6/1982  Ito ................................. 181/282
5,509,947  4/1996  Burton ............................ 55/276

FOREIGN PATENT DOCUMENTS 64-10645  5/1983  Japan .

*Primary Examiner*—Khanh Dang

[57] ABSTRACT

A compact filter structure is provided having a cylindrical body disposed in the expansion chamber of a muffler. A tail pipe is inserted into the filter. The diameter of the filter is greater than that of the tail pipe. The filtering function of the body and the noise reducing function of the tail pipe are separated from each other. The filter structure can be formed in a compact construction which provides a large filtering capacity.

10 Claims, 4 Drawing Sheets

SPARK ARRESTER FOR AN EXHAUST UNIT OF A VEHICLE

BACKGROUND OF THE INVENTION

1. Field of the Invention

A spark arrester for the exhaust unit of a vehicle, such as a motorcycle.

2. Description of Background Art

A spark arrester is disclosed in Japanese Patent Publication No. Sho 64-10645 wherein a tail pipe is provided with a plurality of small holes in its wall and is disposed in the expansion chamber of a muffler. A metal net is provided for covering the tail pipe.

The diameter and the length of the tail pipe are dependent on the relation between engine performance and the exhaust noise. In the spark arrester of the aforesaid construction, the filter is attached directly to the outer circumference of the tail pipe and hence the filtering capacity cannot be optionally increased. It is an object of the present invention to solve such a problem.

SUMMARY AND OBJECTS OF THE INVENTION

To solve the foregoing problem, the present invention provides a spark arrester for the exhaust unit of a vehicle, having a muffler internally defining an expansion chamber. A tail pipe is provided of a comparatively small diameter placed in the rear section of the muffler. A cylindrical mesh filter, of a diameter greater than that of the tail pipe, is disposed in the expansion chamber so as to surround a portion of the tail pipe extending within the expansion chamber.

Since the filter is a metal net cylinder having a diameter greater than the outside diameter of the tail pipe for surrounding the tail pipe so as to form a double cylinder structure together with the tail pipe, the filter is able to secure a sufficient capacity irrespective of the diameter of the tail pipe.

Accordingly, the space within the muffler can be effectively utilized and, the diameter of the muffler need not be increased even though the filter has a large capacity. Consequently, the exhaust unit can be formed in a lightweight compact structure.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus are not limitative of the present invention, and wherein.

DETAILED DESCRIPTION OF THE PREFERRED EMBODIMENTS

Figure 1:
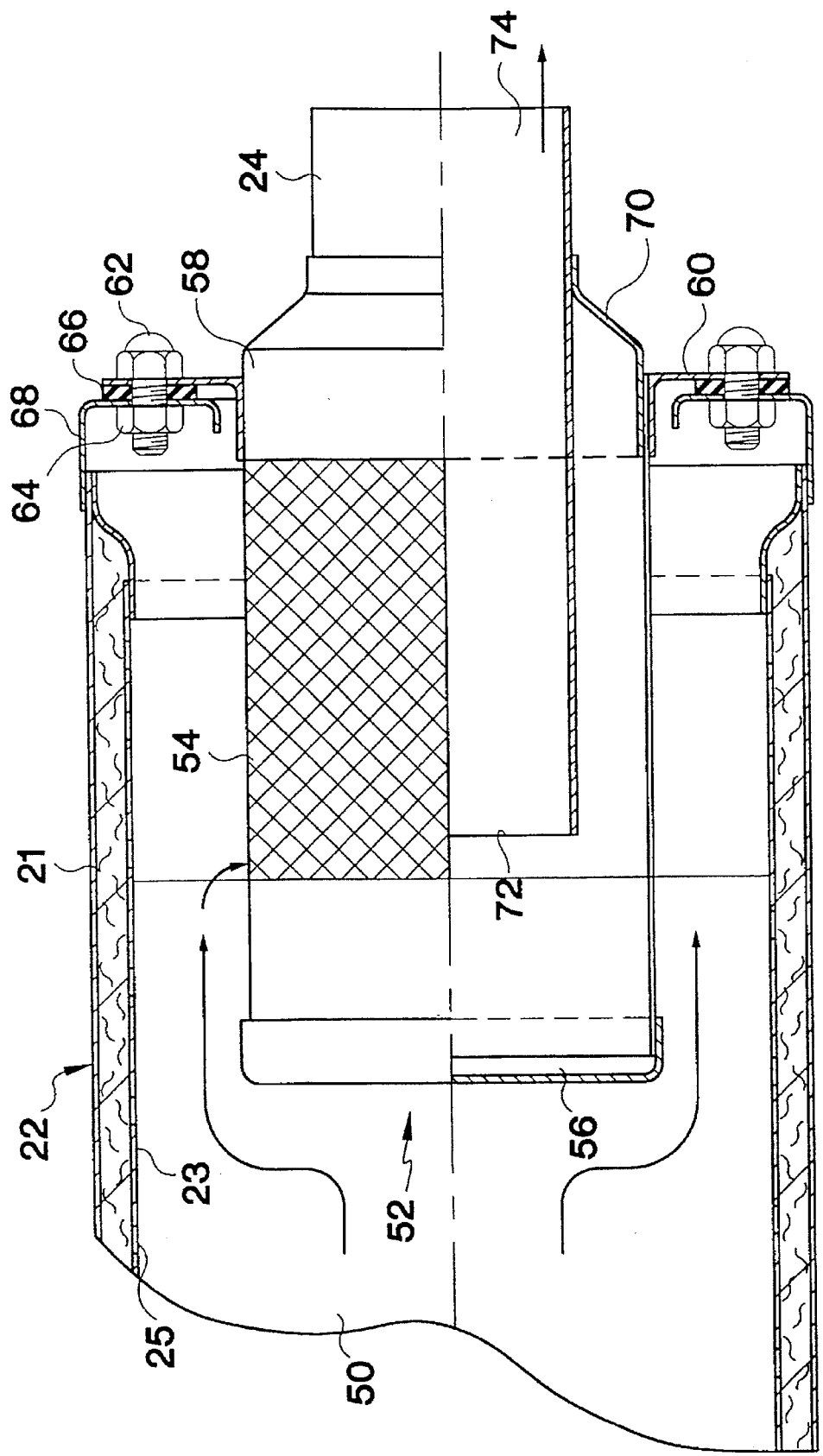
FIG. 1 is an enlarged fragmentary sectional view of an essential portion of a first embodiment.

A spark arrester of a first embodiment of the present invention will be described with reference to FIGS. 1 and 2. FIG. 2 illustrates a side view of an off-road motorcycle. A front wheel 2 is supported on a front fork 4, and a rear wheel 8 is supported on a rear portion of a wheel support 6.

A cradle type body frame comprises a main pipe 10, a front down pipe 12, a lower pipe 14 and a rear down pipe 16. The front portion of the: main pipe 10 forms an oil tank 11 and oil is poured into the oil tank 11 through a filler hole 13.

A straight single-cylinder engine 18 is supported on the body frame. An exhaust pipe 20 extends rearward from the engine 18 and is connected to a muffler 22 disposed above the rear wheel 8.

A small diameter tail pipe 24 projects from the rear end of the muffler 22. The muffler 22 is supported on an extension frame 30 extending rearwardly from seat rails 26 and rear stays 28.

FIG. 2 also illustrates a fuel tank 32, a seat 34, a rear cover 36, a side cover 38, an air cleaner 40, a rear cushion unit 42 and a carburetor 44.

Figure 2:
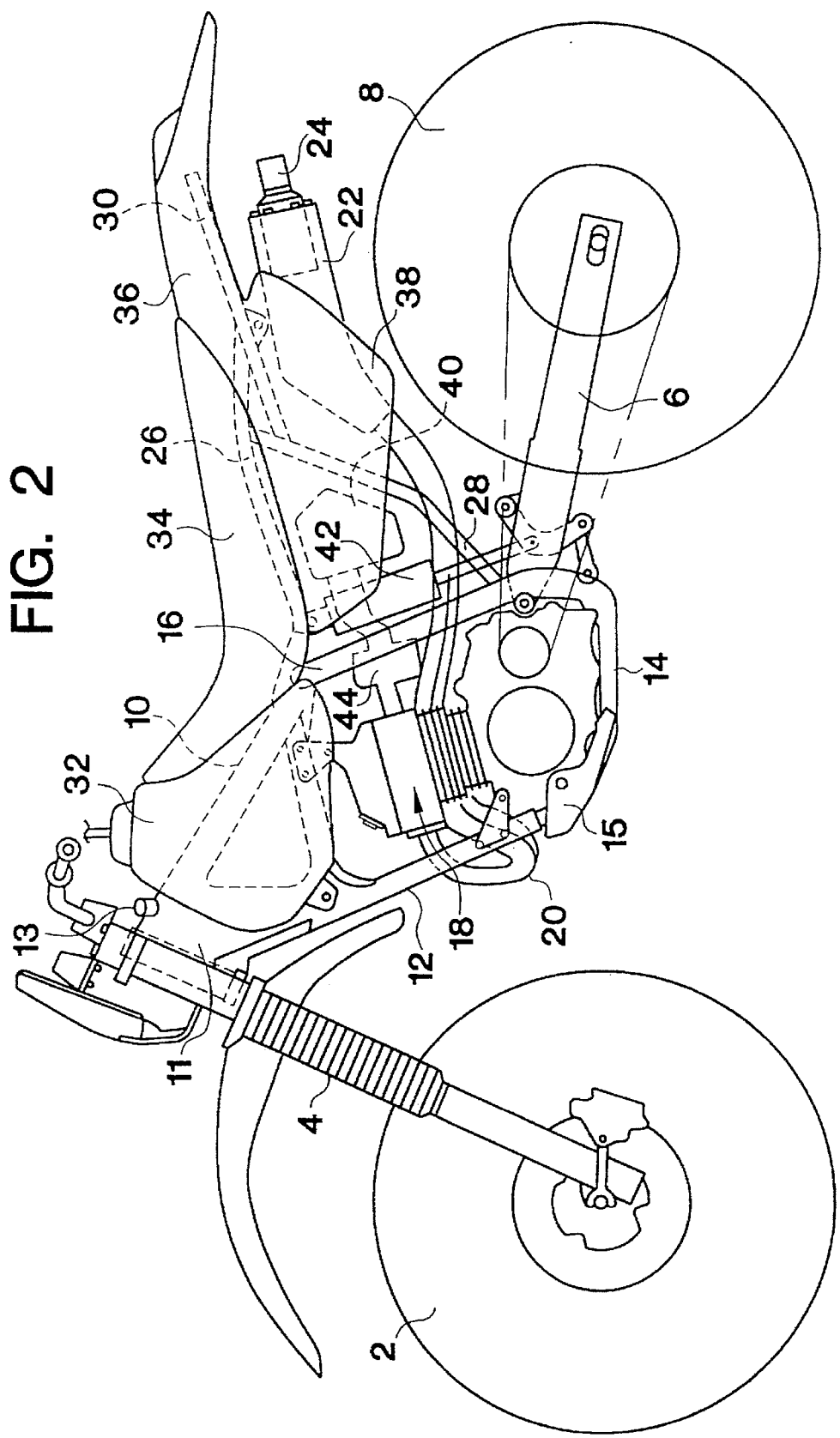
FIG. 2 is a side view of a motorcycle incorporating the first embodiment.

FIG. 1 illustrates the rear portion of the muffler 22 in an enlarged sectional view. The muffler 22 includes an expansion chamber 50, and a filter 52. The tail pipe 24 is disposed in a coaxial arrangement within the expansion chamber 50.

The muffler 22 is a double-wall structure having two coaxial walls. An annular space between the two walls is packed with a sound absorbing material 21, such as glass wool, to absorb exhaust noise prevailing in the expansion chamber 50 and transmitted thereto through the holes of the inner wall 23 of a punched metal sheet.

The filter 52 has a cylindrical body 54 made of a metal net. A cap 56 closes the front end of the body 54, and a cap 58 closes the rear end of the body 54.

The diameter of the filter 52 is greater relative to the diameter of the tail pipe 24. The body 54 is radially separated from the tail pipe 24 by a sufficiently large space.

The cap 58 is provided with a flange 60 on the outer circumference thereof. The flange 60 is fastened through a gasket 66 to the tail cap 68 of the muffler 20 with bolts 62 and nuts 64. The filter 52 is supported within and is substantially concentrically arranged relative to the expansion chamber 50.

The tail pipe 24 is supported within and substantially concentrically with the filter 52 by the tapered rear end 70 of the cap 58. Most parts of the overall length of the tail pipe 24 are covered with the filter 52. The front open end 72 of the tail pipe 24 is located in the body 54, and the rear open end 74 of the same projects rearward from the muffler 20 and the filter 52.

The operation of this embodiment will be described hereinafter. Referring to FIG. 1, the exhaust gas discharged into the expansion chamber 50 flows through the body 54 into the filter 52, flows further through the front open end 72 of the tail pipe 24 into the tail pipe 24 and flows outside through the rear open end 74 as indicated by the arrows.

Since the diameter of the body 54 is far greater than that of the tail pipe 24 and has a large surface area securing a sufficiently large filtering capacity, the body 54 is able to arrest the unburnt gas efficiently. The exhaust noise can be satisfactorily reduced by the tail pipe 24 having a smaller diameter.

Accordingly, the filtering function of the filter 52 and the noise reducing function of the tail pipe 24 are exerted individually. The filter 52 has a sufficient capacity and the tail pipe 24 has a satisfactory noise reducing effect which can be combined in a compact unit. Thus, the interior space of the muffler 22 can be used as the expansion chamber 50, the capacity of which is substantially equal to that of the expansion chamber of the conventional muffler. Thus, the space efficiency is improved.

Furthermore, since the dimensions of the muffler 22 need not be increased to secure the filtering capacity, the muffler 22 is more compact, lighter and less expensive than a conventional muffler having the same filtering capacity.

The flow of the exhaust gas is straightened only by the cap 56 and the exhaust gas flows comparatively linearly, which is effective in improving the performance of the engine. The further smooth flow of the exhaust gas can be expected when the cap 56 is formed in a conical shape expanding toward the rear.

Figure 3:
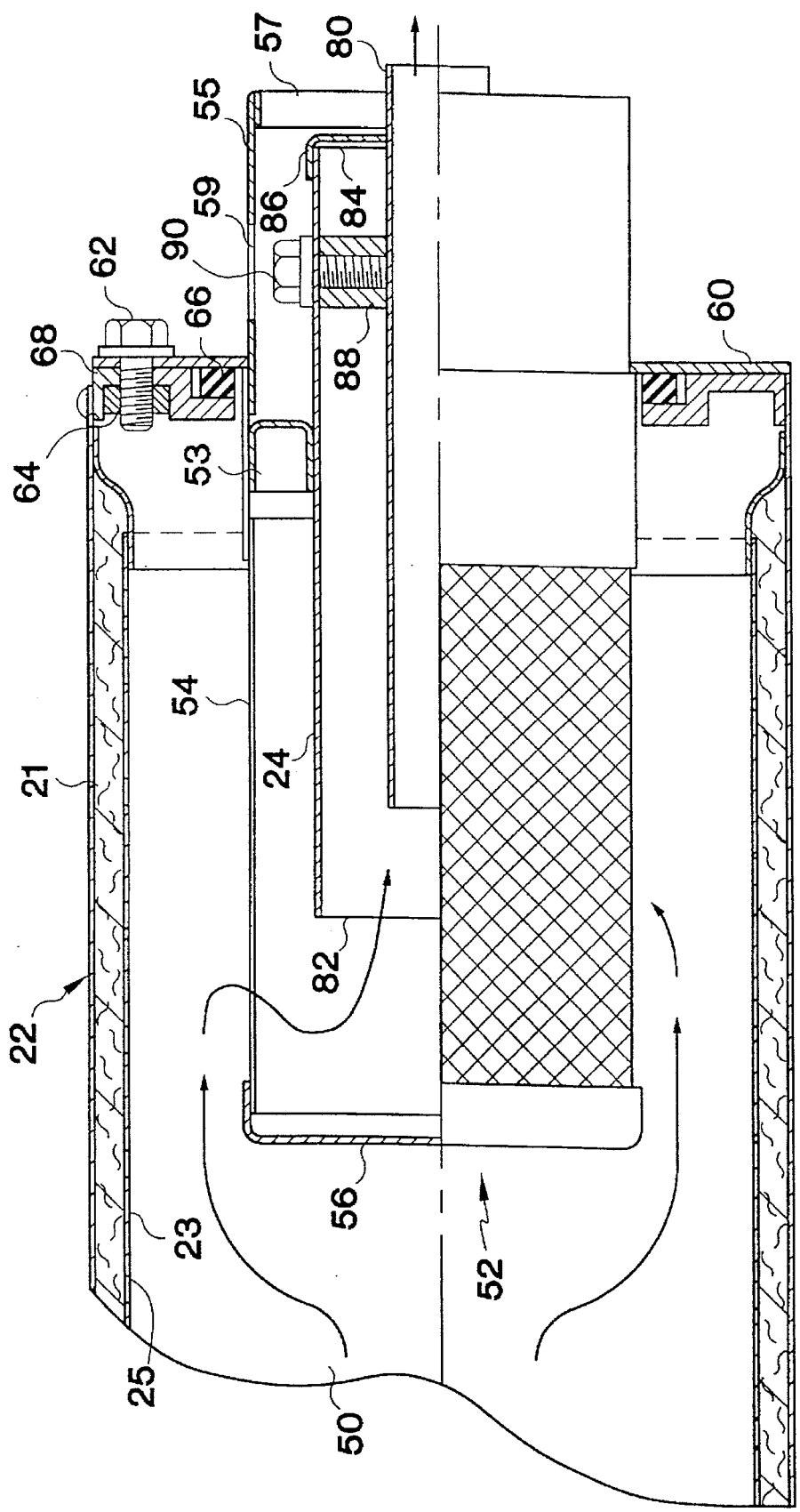
FIG. 3 is a view, similar to FIG. 1, of a second embodiment.

As illustrated in FIG. 3, a portion of a second embodiment having an enhanced noise reducing effect is provided which corresponds to the portion of the first embodiment shown in FIG. 1. Functional parts like or corresponding to those of the first embodiment are designated by the same reference characters and the description thereof will be omitted.

In the embodiment illustrated in FIG. 3, in addition to a filter 52 and a tail pipe 24, a cylindrical diffuser 80 extends coaxially within the tail pipe 24. The filter 52 is inserted in a muffler 22 with a flange 60 formed on the outer circumference of the filter 52 in contact with the rear open end of the muffler 22.

The flange 60 is fastened with bolts 62 and nuts 64 to a retainer 68 riveted or welded beforehand to the open rear end of the muffler 52 with a gasket 66 interposed between the flange 60 and the retainer 68.

The tail pipe 24 is connected to the rear end of the body 54 of the filter 52 and is held coaxially with and within the filter 52 by an intermediate partition wall 53 closing the rear part of the filter 52. The front open end 82 of the tail pipe 24 is located within the body 54, and the rear open end 84 of the tail pipe 24 is closed by an end cap 86.

The diffuser 80 extends coaxially through the end cap 86 and is inserted in the tail pipe 24 from behind through the open end 57 of an extension 55 of the filter 52 which extends outside the muffler 22 and the rear open end 84 of the tail pipe 24. The diffuser 80 is fixed to the tail pipe 24 through a collar 88 with a bolt 90.

The bolt 90 can be fastened and loosened with a tool inserted through a tool hole 59 formed in the wall of the extension 55. The additional diffuser 80 further enhances the noise reducing effect. Since the diffuser 80 can be very easily put in place and removed, the noise reduction level can be adjusted by using the diffuser 80 or omitting the same according to a desired degree of noise.

Figure 4:
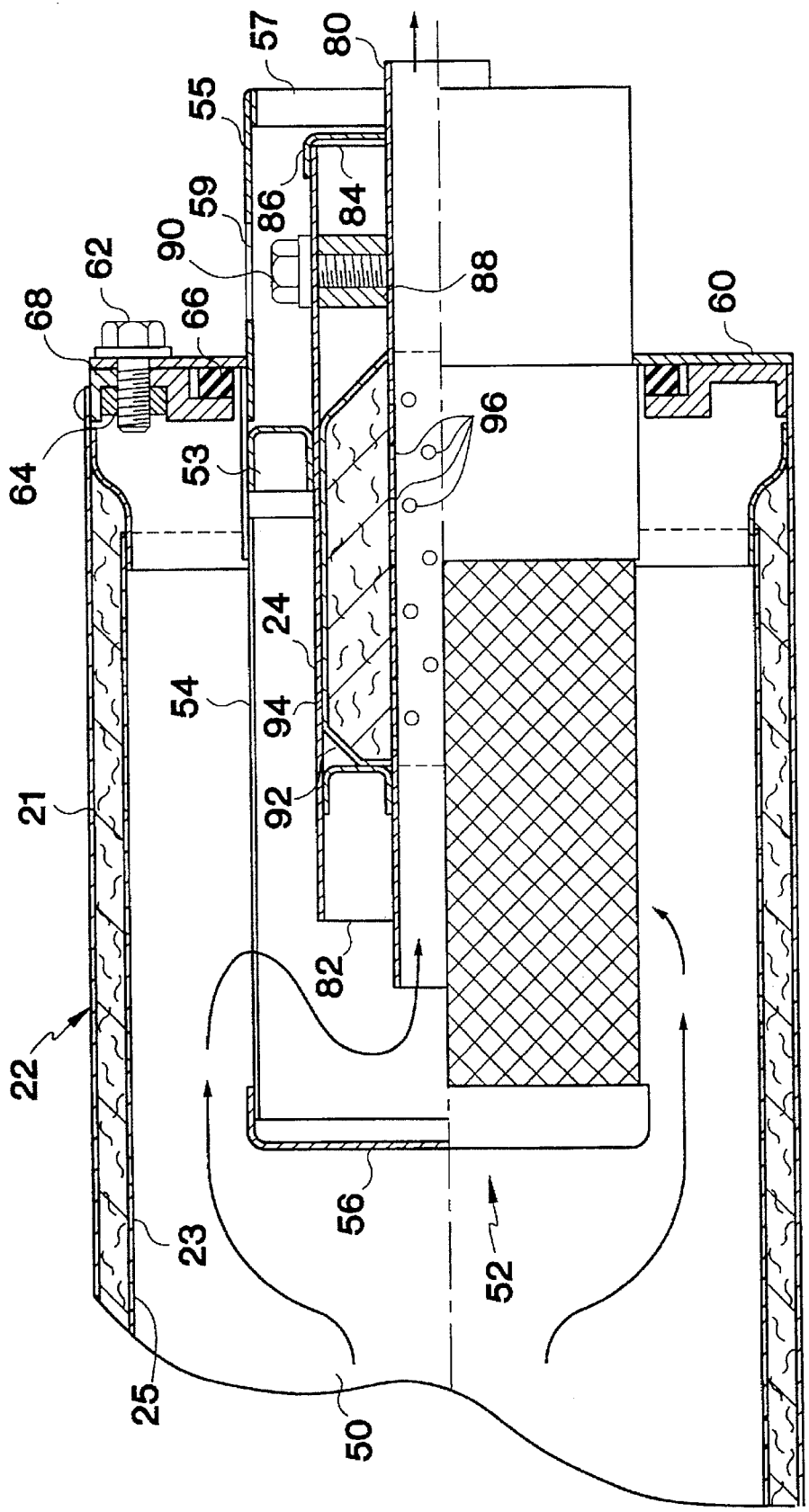
FIG. 4 is a view, similar to FIG. 3, of a third embodiment.

As illustrated in FIG. 4, a portion of a third embodiment having an enhanced noise reducing effect higher than that of the second embodiment is provided which corresponds to the part shown in FIG. 3. In FIG. 4, parts like or corresponding to those shown in FIG. 3 are designated by the same reference characters and the description thereof will be omitted.

This embodiment is provided with a noise eliminator 92 disposed between a diffuser 80 and a tail pipe 24 and packed with glass wool 94. Holes 96 are formed in a portion of the wall of the diffuser 80 corresponding to the noise eliminator 92 so that the interior space of the diffuser 80 communicates with the interior space of the noise eliminator 92 by means of the holes 96.

The diffuser 80 of the third embodiment is longer than the tail pipe 24, and the opposite ends of the diffuser 80 project axially from the opposite ends of the tail pipe 24, respectively. The noise eliminator 92 is able to enhance the noise reducing effect by using the space between the diffuser 80 and the tail pipe 24.

The noise level can be adjusted by adjusting the length of the diffuser 80 to enhance the noise reducing effect. The adjustment of the noise level through the adjustment of the length of the diffuser 80 may be independently used or may be used in combination with the noise eliminator 92.

The present invention is not limited in its practical application to the foregoing embodiments specifically described herein and many modifications thereof are possible. For example, the filter 52 may be tapered toward the rear.

The diffuser 80 serves properly when the same is substantially cylindrical. The diffuser 80 may be a split tube, a tapered tube or a tube having a flared end.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A spark arrester for an exhaust unit of a vehicle including a muffler having a diameter defining an expansion chamber within the muffler, and a tail pipe having a diameter smaller than said diameter of said muffler, said tail pipe being placed in a downstream section of the muffler, said spark arrester comprising:

a cylindrical metal net mesh filter arranged coaxially relative to said muffler and having a diameter larger than the diameter of the tail pipe and disposed in the expansion chamber so as to surround a portion of the tail pipe extending within the expansion chamber;

a cap attached to an outer periphery of said mesh filter for closing a first end of said mesh filter disposed within said muffler;

an end cap for partially closing a second end of said mesh filter and surrounding said tail pipe; and a flange disposed on an outer surface of said end cap for securing said mesh filter and said tail pipe to said muffler to thereby support the mesh filter within the muffler.

2. The spark arrester for an exhaust unit of a vehicle according to claim 1, wherein said muffler includes an outer wall and an inner wall, and further including an insulating member disposed in a space formed between the outer wall and the inner wall of said muffler.

3. The spark arrester for an exhaust unit of a vehicle according to claim 1, and further including a cylindrical diffuser extending through said end cap of said tail pipe and being disposed coaxially therewith.

4. The spark arrester for an exhaust unit of a vehicle according to claim 3 and further including a bolt and collar for securing said diffuser to said tail pipe.

5. The spark arrester for an exhaust unit of a vehicle according to claim 4, and further including a noise eliminator disposed between said diffuser and said tail pipe.

6. The spark arrester for an exhaust unit of a vehicle according to claim 5, wherein said noise eliminator includes insulating material and said diffuser includes a plurality of holes for providing communication between exhaust disposed within said diffuser and said insulating material.

7. A spark arrester for an exhaust unit of a vehicle including a muffler having a diameter defining an expansion chamber within the muffler, and a tail pipe having a diameter smaller than said diameter of said muffler, said tail pipe being placed in a downstream section of the muffler, said spark arrester comprising:

a cylindrical mesh filter having a diameter larger than the diameter of the tail pipe and disposed in the expansion chamber so as to surround a portion of the tail pipe extending within the expansion chamber;

an end cap secured to a downstream end of said tail pipe; and a cylindrical diffuser extending through said end cap of said tail pipe and being disposed coaxially therewith.

8. The spark arrester for an exhaust unit of a vehicle according to claim 7, and further including a bolt and collar for securing said diffuser to said tail pipe.

9. The spark arrester for an exhaust unit of a vehicle according to claim 7, and further including a noise eliminator disposed between said diffuser and said tail pipe.

10. The spark arrester for an exhaust unit of a vehicle according to claim 9, wherein said noise eliminator includes insulating material and said diffuser includes a plurality of holes for providing communication between exhaust disposed within said diffuser and said insulating material.

* * * * *